(12) United States Patent
Holmes et al.

(10) Patent No.: US 8,597,146 B2
(45) Date of Patent: Dec. 3, 2013

(54) POWERTRAIN WITH TWO PLANETARY GEAR SETS, TWO MOTOR/GENERATORS AND MULTIPLE POWER-SPLIT OPERATING MODES

(75) Inventors: Alan G. Holmes, Clarkston, MI (US); Norman K. Bucknor, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 276 days.

(21) Appl. No.: 13/220,773

(22) Filed: Aug. 30, 2011

(65) Prior Publication Data

US 2013/0053201 A1    Feb. 28, 2013

(51) Int. Cl.
*F16H 3/72*     (2006.01)
*F16H 3/44*     (2006.01)
*B60W 10/02*    (2006.01)

(52) U.S. Cl.
USPC .................................... 475/5; 475/290; 477/5

(58) Field of Classification Search
USPC ............. 475/5, 151, 271, 280–292, 296, 330; 477/5; 180/53.1, 53.8
See application file for complete search history.

(56) References Cited

U.S. PATENT DOCUMENTS

| | | | |
|---|---|---|---|
| 6,729,998 B2* | 5/2004 | Egami | 477/3 |
| 7,998,016 B2* | 8/2011 | Si et al. | 475/284 |
| 8,241,166 B2* | 8/2012 | Sung | 475/280 |
| 2008/0045365 A1* | 2/2008 | Usoro | 475/5 |
| 2010/0137091 A1* | 6/2010 | Park et al. | 475/5 |
| 2011/0111909 A1* | 5/2011 | Kim et al. | 475/5 |
| 2011/0319211 A1* | 12/2011 | Si | 475/5 |
| 2013/0041535 A1* | 2/2013 | Choi et al. | 701/22 |

* cited by examiner

*Primary Examiner* — Roger Pang
(74) *Attorney, Agent, or Firm* — Quinn Law Group, PLLC

(57) ABSTRACT

A powertrain operable in input-split, output-split and compound-split operating modes includes a first motor/generator continuously connected with a first member of a first planetary gear set. A second motor/generator is continuously connected with a first member of a second planetary gear set. An input member is continuously connected with a second member of the first planetary gear set. An output member is continuously connected with a second member of the second planetary gear set. A first brake grounds a third member of the first planetary gear set. A second brake grounds a third member of the second planetary gear. A first clutch connects the third member of the first planetary gear set with the second member of the second planetary gear set. A second clutch connects the second member of the first planetary gear set with the third member of the second planetary gear set.

20 Claims, 3 Drawing Sheets

|     | 50 | 54 | 52 | 56 |
|-----|----|----|----|----|
| 400 |    |    |    |    |
| 402 | X  |    |    |    |
| 404 |    | X  |    |    |
| 406 |    |    | X  |    |
| 408 |    |    |    | X  |
| 410 | X  | X  |    |    |
| 412 | X  |    | X  |    |
| 414 | X  |    |    | X  |
| 416 |    | X  | X  |    |
| 418 |    | X  |    | X  |
| 420 |    |    | X  | X  |
| 422 | X  | X  | X  |    |
| 424 |    | X  | X  | X  |
| 426 | X  |    | X  | X  |
| 428 | X  | X  |    | X  |
| 430 | X  | X  | X  | X  |

FIG. 5

|     | 50 | 54 | 52 | 56 |
|-----|----|----|----|----|
| 416 |    | X  | X  |    |
| 404 |    | X  |    |    |
| 418 |    | X  |    | X  |
| 408 |    |    |    | X  |
| 414 | X  |    |    | X  |

FIG. 6

|     | 50 | 54 | 52 | 56 |
|-----|----|----|----|----|
| 416 |    | X  | X  |    |
| 406 |    |    | X  |    |
| 412 | X  |    | X  |    |
| 402 | X  |    |    |    |
| 414 | X  |    |    | X  |

FIG. 7

|     | 50 | 54 | 52 | 56 |
|-----|----|----|----|----|
| 400 |    |    |    |    |
| 406 |    |    | X  |    |
| 426 | X  |    | X  | X  |
| 424 |    | X  | X  | X  |

FIG. 8

POWERTRAIN WITH TWO PLANETARY GEAR SETS, TWO MOTOR/GENERATORS AND MULTIPLE POWER-SPLIT OPERATING MODES

TECHNICAL FIELD

The invention relates to a powertrain for a hybrid vehicle. The powertrain has two planetary gear sets and two motor/generators.

BACKGROUND

Powertrains with an electrically-variable transmission typically have an input member, an output member, and two electric motor/generators connected to different members of planetary gear sets. Engagement of torque-transmitting mechanisms may allow one or more electrically-variable modes of operation, fixed speed ratio modes, and an electric-only (battery-powered) mode. Electrically-variable transmissions may improve vehicle fuel economy in a variety of ways, primarily by using one or both of the motor/generators for vehicle braking and using the regenerated energy to power the vehicle electrically, with the engine off. The engine may be turned off at idle, during periods of deceleration and braking, and during periods of low speed or light load operation to eliminate inefficient engine operation and engine friction losses. Braking energy captured via regenerative braking (or electrical energy generated during periods when the engine is operating) is utilized during these engine-off periods. Transient demand for engine torque or power is supplemented by the motor/generators during operation in engine-on modes, allowing for a smaller engine without reducing vehicle performance. Additionally, the electrically-variable modes may allow the engine to be operated at or near the optimal efficiency point for a given power demand.

SUMMARY

A hybrid powertrain is provided with a minimum of components to improve a power to weight ratio of the powertrain, improving fuel economy and electric range of a vehicle with the powertrain. Additionally, torque multiplication is provided from motor/generators to the engine and to an output member to help reduce motor size requirements. The powertrain provides input-split, output-split, and compound-split operating modes, among other operating modes.

The powertrain includes a hybrid transmission with an input member, an output member, and a stationary member, such as a transmission casing. A first and a second electric motor/generator are provided. Only two planetary gear sets are used, each having a respective first, second, and third member. The first motor/generator is continuously connected for common rotation with the first member of the first planetary gear set. The second motor/generator is continuously connected for common rotation with the first member of the second planetary gear set. The input member is continuously connected for common rotation with the second member of the first planetary gear set. The output member is continuously connected for common rotation with the second member of the second planetary gear set. A first brake is selectively engageable to ground the third member of the first planetary gear set to the stationary member. A second brake is selectively engageable to ground the third member of the second planetary gear to the stationary member. A first clutch is selectively engageable to connect the third member of the first planetary gear set for common rotation at the same speed as the second member of the second planetary gear set. A second clutch is selectively engageable to connect the second member of the first planetary gear set for common rotation at the same speed as the third member of the second planetary gear set. Engagement of only the first brake allows the engine to be started by the first motor/generator without any effect on torque at the output member (i.e., without causing rotation of the output member). The powertrain is operable to provide an input-split mode of operation, a compound-split mode of operation, and an output-split mode of operation. Thus, multiple power-split operating modes are available with a hybrid transmission that has only two simple planetary gear sets, two brakes and two clutches. The hybrid transmission and powertrain may present a cost savings and fuel economy savings over hybrid transmissions that require additional planetary gear sets, compound planetary gear sets, or more brakes and clutches to provide similar functionality (i.e., similar operating modes).

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 5 is a table showing an engagement schedule of torque-transmitting mechanisms of the powertrain to establish various operating modes of the powertrain of FIGS. 1-4, as well as various modes in which one or more components of the powertrain are locked due to the engaged torque-transmitting mechanisms;

FIG. 6 is a table showing an engagement schedule for one sequence of some of the operating modes of FIG. 5;

FIG. 7 is a table showing an engagement schedule for another sequence of some of the operating modes of FIG. 5; and FIG. 8 is a table showing an engagement schedule for yet another sequence of some of the operating modes of FIG. 5.

DETAILED DESCRIPTION

Figure 1:
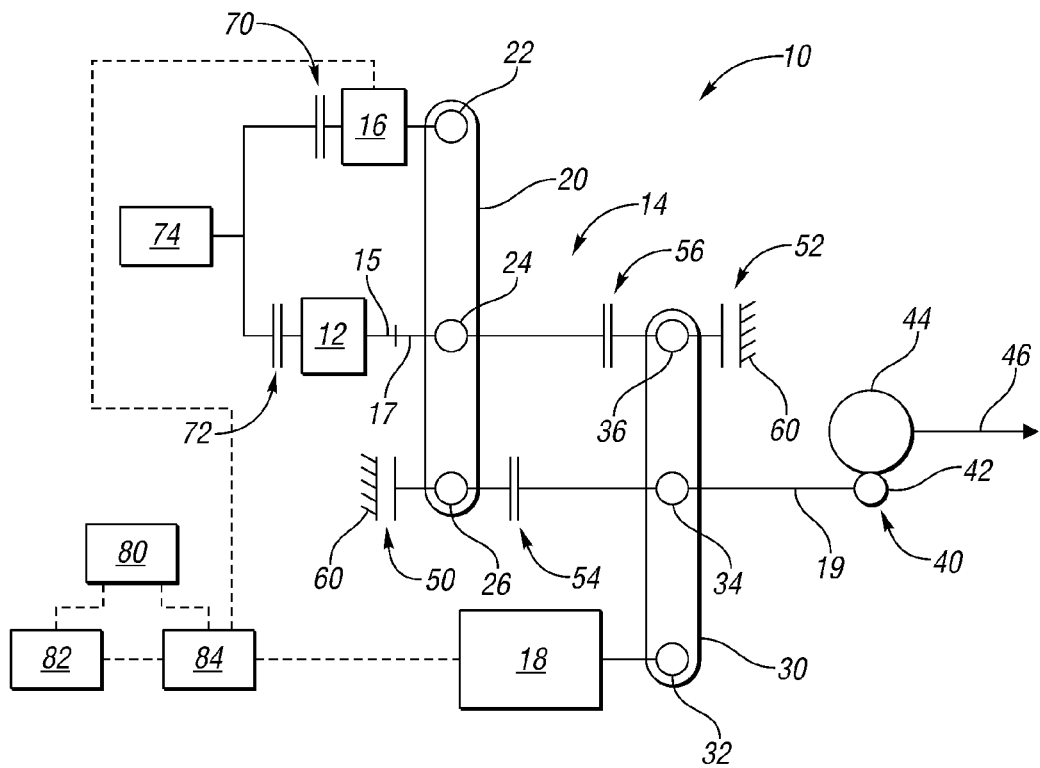
FIG. 1 is a schematic illustration of a powertrain in lever diagram form.

Referring to the drawings, FIG. 1 shows a hybrid powertrain 10 that includes a prime mover, such as an internal combustion engine 12, connected with a hybrid transmission 14. Other types of prime movers, such as fuel cells, pneumatic engines, etc. may be used in place of an internal combustion engine. The hybrid transmission 14 includes two additional motive sources, a first motor/generator 16 and a second motor/generator 18. The engine 12 and motor/generators 16 and 18 are interconnected via two planetary gear sets 20 and 30 to provide various operating modes.

A first planetary gear set 20 includes a first member 22, a second member 24, and a third member 26. In the embodiment shown, the first member 22 is a sun gear member, the second member 24 is a carrier member that rotatably supports pinion gears 27 (shown in FIGS. 2-4), and the third member

26 is a ring gear member. The pinion gears 27 shown in FIG. 2 mesh with both the first member 22 and the third member 26.

A second planetary gear set 30 includes a first member 32, a second member 34, and a third member 36. In the embodiment shown, the first member 32 is a sun gear member, the second member 34 is a carrier member that rotatably supports pinion gears 37 (shown in FIGS. 2-4), and the third member 36 is a ring gear member. The pinion gears 37 shown in FIGS. 2-4 mesh with both the first member 32 and the third member 34.

Figure 2:
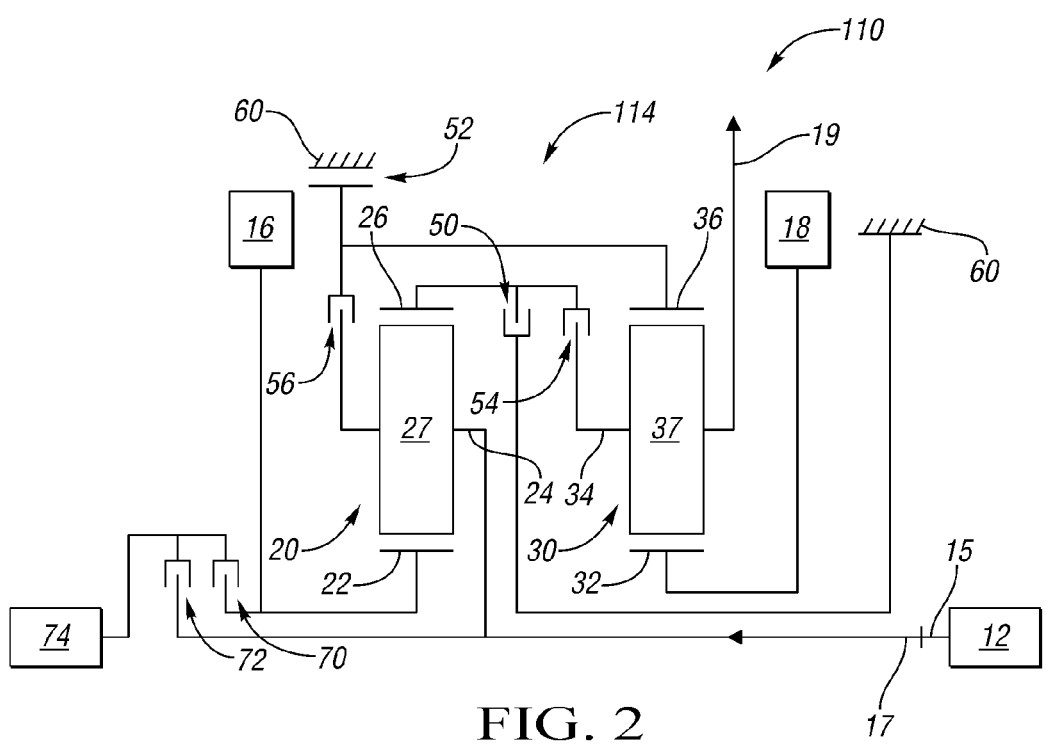
FIG. 2 is a schematic illustration of a first embodiment of the powertrain of FIG. 1 in stick diagram form.
Figure 3:
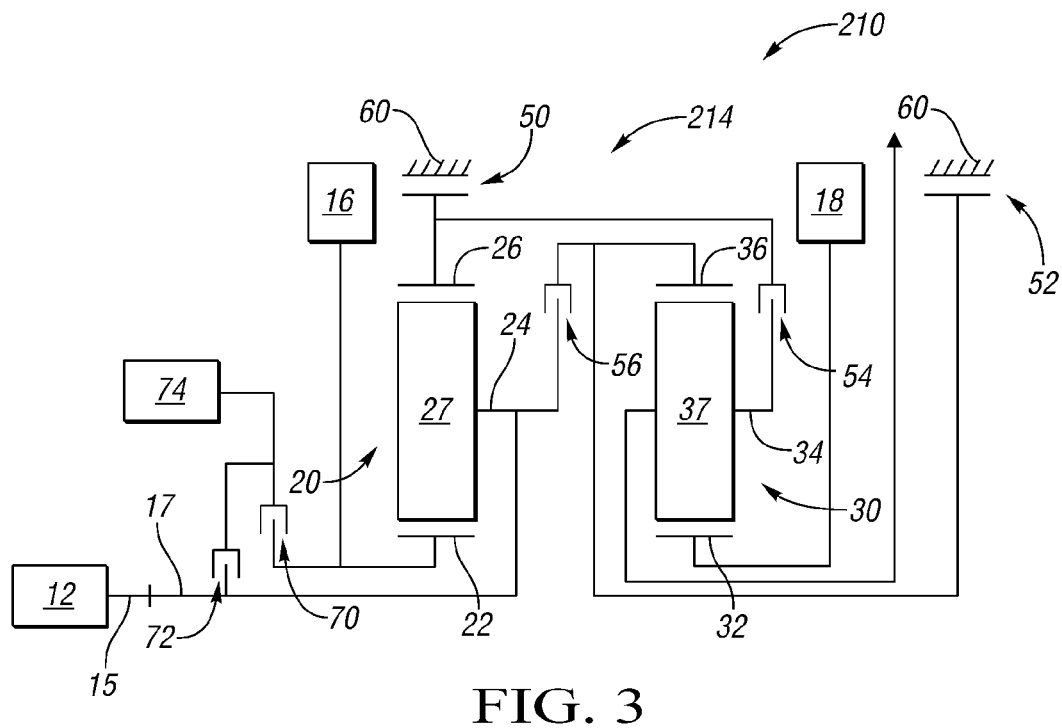
FIG. 3 is a schematic illustration of a second embodiment of the powertrain of FIG. 1 in stick diagram form.
Figure 4:
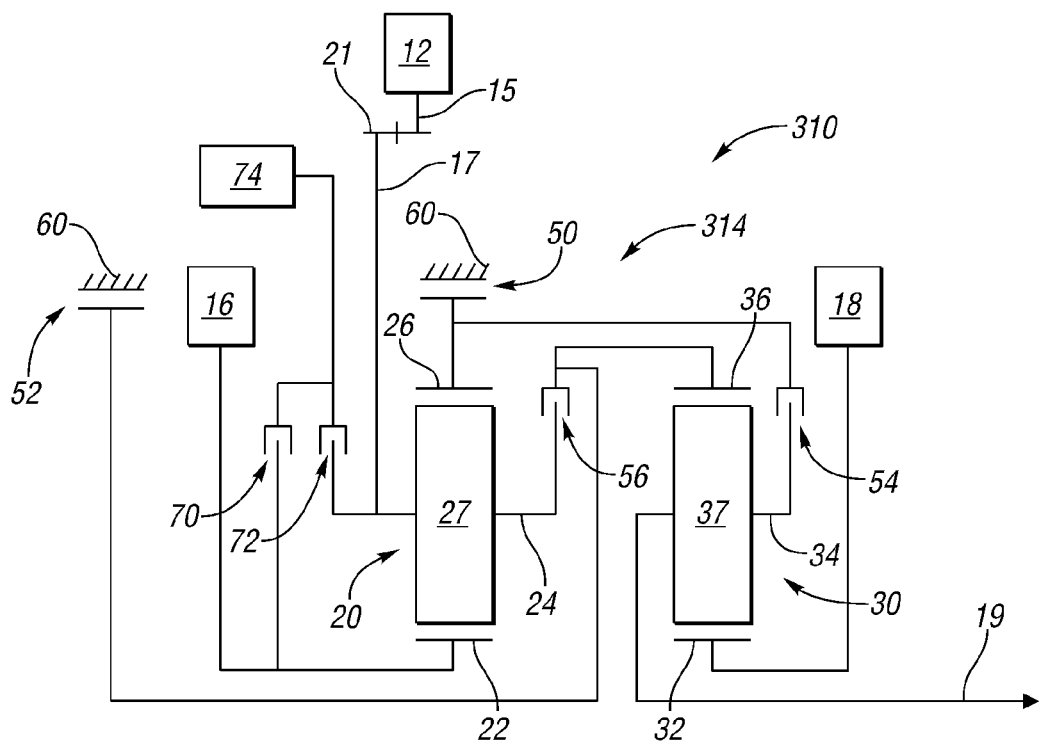
FIG. 4 is a schematic illustration of a third embodiment of the powertrain of FIG. 1 in stick diagram form.

A person of ordinary skill in the art will understand the structure of such a powertrain 10 with simple planetary gear sets 20, 30, which are shown only schematically in lever diagram form in FIG. 1, and are shown in stick diagram form in the embodiments of FIGS. 2-4.

The transmission 14 has an input member 17 continuously connected for common rotation with the second member 24, and with an output member 15 of the engine 12. As used herein, when the components are "connected for common rotation", they rotate at the same speed, including a speed of zero (i.e., stationary). Thus, the engine output member 15, which may be an engine crankshaft or a ratio multiplying connection to the engine crankshaft, such as a geared connection or a series of pulleys and sprockets, is continuously connected for common rotation with the second member 24.

The transmission 14 also has an output member 19 that is continuously connected for common rotation with the second member 34 of the second planetary gear set 30. The output member 19 is connected through a final drive mechanism 40 to vehicle wheels (not shown) to provide tractive power to the wheels to propel the vehicle. The final drive mechanism 40 includes a set of intermeshing gears, shown here as a first gear 42 and a second gear 44 meshing with the first gear 42, as well as a final drive output 46 to vehicle axles.

A rotor of the first motor/generator 16 is connected for common rotation with the first member 22 of the first planetary gear set 20. A rotor of the second motor/generator 18 is connected for common rotation with the first member 32 of the second planetary gear set 30. None of the members of the planetary gears set 20 are continuously connected for common rotation with any of the members of planetary gear set 30.

The transmission 14 includes four torque-transmitting mechanisms, two of which are brakes and two of which are clutches. A first brake 50 is selectively engageable to ground the third member 26 of the first planetary gear set 20 to a stationary member 60, such as a transmission casing, so that the third member 26 does not rotate. A second brake 52 is selectively engageable to ground the third member 36 of the second planetary gear set 30 to the stationary member 60 so that the third member 36 does not rotate. A first clutch 54 is selectively engageable to connect the third member 26 of the first planetary gear set 20 for common rotation with the second member 34 of the second planetary gear set 30. A second 56 is selectively engageable to connect the third member 36 of the second planetary gear set 30 for common rotation with the second member 24 of the first planetary gear set 20.

Optionally, first and second additional clutches 70, 72 may be included to allow an air conditioner compressor 74 on a vehicle having the powertrain 10 to be powered by the powertrain 10. Specifically, when the clutch 70 is engaged, the air conditioner compressor 74 is connected for rotation with a rotor of the first motor/generator 16. The first motor/generator 16 may be used to power the air conditioner compressor 74 in any of the operating modes described below in which the first motor/generator 16 is operating as a motor. When the clutch 72 is engaged, the engine output member 15 is connected for rotation with the air conditioning compressor 74, and the engine 12 may be used to power the air conditioner compressor 74 in any of the operating modes described below in which the engine 12 is on.

Stator portions of the motor/generators 16 and 18 are mounted to the stationary member 60 and are operatively connected to an energy storage device 80 that may be one or more batteries or battery modules. Other electric storage devices that have the ability to store electric power and dispense electric power may be used in place of the batteries. A controller 82 operatively connected to the motor/generators 16 and 18 monitors the speed of the rotors. The controller 82 also receives information regarding engine speed, either from a separate engine controller, or by connection to the engine 12. Based on this and other vehicle operating conditions, such as driver accelerator commands, the controller 82 is operable to provide electrical energy from the energy storage device 80 through a power inverter 84 to either or both motor/generators 16 and 18 to cause the motor/generators 16, 18 to function as motors, adding torque to the transmission 14. The power inverter 84 converts direct current to alternating current when electrical power is provided to the motor/generators 16 and/or 18. If the information received by the controller 82 indicates that either motor/generator 16 or 18 should be operated as a generator, converting mechanical energy into electrical energy, the controller 82 is operable to cause the power inverter 84 to convert alternating current provided from either motor/generator 16, 18 into direct current stored in the energy storage device 80. The dashed lines between the motor/generators 16, 18, and the energy storage device 80, controller 82, and inverter 84 represent transfer conductors for relaying electrical current or signals between the components.

FIG. 2 is a first embodiment of a powertrain 110 in stick diagram form that is representable by the powertrain 10 shown in FIG. 1 in lever diagram form. The powertrain 110 includes a transmission 114, the engine 12, and motor/generators 16, 18. The powertrain 110 also includes the energy storage device 80, controller 82, and inverter 84 connected to the motor/generators 16, 18. Although these components are not shown in FIG. 2, they are operatively connected to the motor/generators 16, 18 in the same manner as described with respect to FIG. 1. Many components of the powertrain 110 are identical to those of powertrain 10 and are indicated with like reference numbers. Those of ordinary skill in the art understand the correspondence between a transmission shown in lever diagram form and a transmission shown in stick diagram form. In the powertrain 110, the engine 12 and air conditioner compressor 74 share a common axis of rotation with the input member 17 (i.e., are "on-axis"), and the output member 19 has a different axis of rotation (i.e., is "off-axis"). An off-axis transfer gear (not shown) is used to connect the output member 19 to a final drive mechanism. The input member 17 is concentric with other shafts and hubs in the transmission 14.

FIG. 3 is a second embodiment of a powertrain 210 in stick diagram form that is representable by the powertrain 10 shown in FIG. 1 in lever diagram form. The powertrain 210 includes a transmission 214, the engine 12, and motor/generators 16, 18. The powertrain 210 also includes the energy storage device 80, controller 82, and inverter 84 connected to the motor/generators 16, 18. Although these components are not shown in FIG. 3, they are operatively connected to the motor/generators 16, 18 in the same manner as described with respect to FIG. 1. Many components of the powertrain 210 are identical to those of powertrain 10 and are indicated with like reference numbers. In the powertrain 210, the engine 12 and air conditioner compressor 74 share a common axis of rotation with the input member 17 (i.e., are "on-axis"), and the output member 19 has a different axis of rotation (i.e., is "off-axis"). An off-axis transfer gear (not shown) is used to connect the output member 19 to a final drive mechanism. The input member 17 is concentric with other shafts and hubs in the transmission 14.

FIG. 4 is a third embodiment of a powertrain 310 in stick diagram form that is representable by the powertrain 10 shown in FIG. 1 in lever diagram form. The powertrain 310 includes a transmission 314, the engine 12, and motor/generators 16, 18. The powertrain 310 also includes the energy storage device 80, controller 82, and inverter 84 connected to the motor/generators 16, 18. Although these components are not shown in FIG. 4, they are operatively connected to the motor/generators 16, 18 in the same manner as described with respect to FIG. 1. Many components of the powertrain 310 are identical to those of powertrain 10 and are indicated with like reference numbers. In the powertrain 310, the engine 12 and air conditioner compressor 74 do not share a common axis of rotation with the transmission input member 17 (i.e., are "off-axis"), and the output member 19 has a different axis of rotation (i.e., is "off-axis"). Because of the off-axis input member 17, the transmission 314 has one less concentric shaft in comparison to the transmission 214, as is apparent in FIGS. 3 and 4. An off-axis transfer gear 21 is used to connect the engine output member 15 to the input member 17. A final drive mechanism (not shown) that has an axis of rotation that is concentric with the output member 17 may be used.

FIG. 5 is a table of clutch engagement states indicating the engagement status of each of the brakes 50, 52 and clutches 54 and 56 to establish various operating modes for propulsion of a vehicle by providing torque at the output member 19 of the powertrains 10, 110, 210, 310, as well a neutral mode, a neutral charging mode, and various states in which one or more of the output member 19, the motor/generators 16, 18 and the engine 12 is held "locked" or stationary due to the engaged torque-transmitting mechanisms, as described herein. In FIG. 5, an "X" indicates that the brake or clutch represented by the column is engaged. A box that is empty indicates that the brake or clutch represented by the column is not engaged.

In FIG. 5, row 400 indicates a mechanical neutral operating mode in which none of the brakes 50, 52 and clutches 54, 46 are engaged. When the engine 12 is on (i.e., has been started) in the mechanical neutral operating mode, no torque can be transferred to the output member 19.

Row 402 indicates a mechanical neutral operating mode in which only brake 50 is engaged. In the operating mode of row 402, with the brake 50 engaged, the first planetary gear set 20 is active and the first motor/generator 16 may be operated as a motor to start the engine 12, with torque multiplication from the first member 22 to the second member 24 (i.e., sun gear member to carrier member). The motor/generator 16 is never connected to any other member of the planetary gear sets 20, 30 other than the first member 22. Because of the torque multiplication from the first member 22 to the second member 24, the motor/generator 16 may have relatively low torque and power requirements and still provide sufficient torque and power to start the engine 12. Once the engine 12 is started, the first motor/generator 16 may be controlled to act as a generator, with the engine 12 powering the first motor/generator 16, which charges the energy storage device 80.

Row 404 indicates a transitional mode in which only the first clutch 54 is engaged, the engine 12 is on, and the motor/generator 16 is controlled to operate as a motor or as a generator as necessary for the engine 12 and motor/generator 16 to drive the output member 19 via the third member 26. The motor/generator 18 can freewheel without affecting the speed of the output member 19, and thus can be operated to control the speed of the third member 36 to allow synchronous engagement or disengagement of the second brake 52 or synchronous engagement or disengagement of the second clutch 56, as further described with respect to FIG. 6.

Row 406 indicates an electric-only operating mode in which only the second brake 52 is engaged. The second motor/generator 18 is controlled to function as a motor to provide torque required at the output member 19. Because the third member 26 of the first motor/generator is not connected to any other member or to the stationary member 60, the first planetary gear set 20 is not active. Thus, the status of the engine 12 (on or off) and the speed of the first motor/generator 16 do not affect the output member 19. Accordingly, the engine 12 and the motor/generator 16 may be controlled to synchronize the speed of the third member 26 with the stationary member 60 (i.e., zero speed) to transition between the electric-only operating mode of row 406 and a series operating mode of row 412, described below. Alternately, the engine 12 and the motor/generator 16 may be controlled to synchronize the speed of the third member 26 with the speed of the output member 19 to transition between the mode of row 406 and an input-split operating mode of row 416. Transitioning between the electric-only mode of row 406 and the mode of row 414 or the mode of row 416 is further described with respect to FIG. 7.

Row 408 indicates a transitional operating mode that may be referred to as a quasi-electric torque converter mode. Only the second clutch 56 is engaged in this mode. The mode of row 408 is referred to as a transitional mode, as it may be used in transitioning between an output-split operating mode of row 414 and a compound-split operating mode of row 418 with synchronous engagement or disengagement of brake 50 or synchronous engagement or disengagement of clutch 54, as further described with respect to FIG. 6.

Row 410 indicates an operating state in which only the first brake 50 and the first clutch 54 are engaged. If the powertrain 10, 110, 210 or 310 is operated in this state, the output member 19 will be held stationary as it will be grounded to the stationary member 60. The engine 12 and the motor/generators 16, 18 may be operated at any speed without propelling a vehicle having the powertrain 10, 110, 210 or 310.

Row 412 indicates a series operating mode in which both of the brakes 50, 52 and neither of the clutches 54, 56 are engaged. In the series operating mode, both planetary gear sets 20 and 30 are active. The engine 12 is on. The first motor/generator 16 is controlled to function as a generator, receiving mechanical power from the engine 12 which is converted to electrical power to operate the second motor/generator 18 as a motor to add torque at the output member 19. Some of the electric power generated by the first motor/generator 16 may also be stored in the energy storage device 80, depending on the torque requirements at the output member 19 and the level of charge of the energy storage device 80. Operating in the series operating mode allows better fuel economy at lower speeds of the output member 19 because the engine 12 may be operated at its optimal speed for fuel economy as there is no mechanical connection from the engine 12 to the output member 19 in the series operating mode.

Row 414 indicates an electrically-variable, output-split operating mode, in which only the first brake 50 and the second clutch 56 are engaged. The engine 12 is on. The motor/generators 16 and 18 may each operate as a motor or as a generator as necessary to assist the engine 12 in providing the torque required at the output member 19. The mode of row 414 is an output-split operating mode because the power provided from the engine 12 and from the motor/generator 18 is combined at the output member 19 through the second planetary gear set 30. The engine 12 can be operated at its best operating speed to improve fuel economy, while the speed of the motor/generator 18 is varied to meet the changing speed and torque requirements at the output member 19.

Row 416 indicates an electrically-variable, input-split operating mode in which only the second brake 52 and the first clutch 54 are engaged. The engine 12 is on. The motor/generators 16 and 18 may each operate as a motor or as a generator as necessary to assist the engine 12 in providing the torque required at the output member 19. The mode of row 416 is an input-split operating mode because the power provided from the engine 12 is split through the first planetary gear set 20 into a mechanical path via the planetary gear sets 20, 30 and an electrical path via the motor/generator 16. The engine 12 can be operated at its best operating speed to improve fuel economy, while the speeds of the motor/generator 16 and the motor/generator 18 are varied to meet the changing speed and torque requirements at the output member 19.

Row 418 indicates a compound-split operating mode in which both clutches 54 and 56 are engaged and neither brake 50 nor brake 52 is engaged. The engine 12 is on. The motor/generators 16 and 18 may each operate as a motor or as a generator as necessary to assist the engine 12 in providing the torque required at the output member 19. The mode of row 418 is a compound-split operating mode because the torque provided at the output member 19 from the engine 12 and from the motor/generator 16 is combined through both the first planetary gear set 20 due to engagement of clutch 54 and through the second planetary gear set due to engagement of clutch 56. This operating mode may be referred to as a load-sharing mode, as the torque requirement at the output member 19 is shared by the engine 12, the first motor/generator 16 and the second motor/generator 18. With both of the motor/generators 16, 18 operating, the engine 12 may be operated at its best brake specific fuel consumption (BSFC) speed and torque.

Row 420 indicates an operating state in which only the second brake 52 and the second clutch 56 are engaged. If the powertrain 10 is operated in this state, the crankshaft 15 of the engine 12 and the input member 17 will be held stationary as the second member 24 will be grounded to the stationary member 60 via the third member 36. The motor/generator 16 may be operated at any speed without affecting the output member 19, and the second motor/generator 18 may be operated as a motor to provide torque at the output member 19 through the planetary gear set 30.

Row 422 indicates an operating state in which both brakes 50, 52 and the first clutch 54 are engaged. If the powertrain 10, 110, 210 or 310 is operated in this state, the output member 19 and motor/generator 18 will be locked (nonrotatable), while the engine 12 and the motor/generator 16 will be free to rotate relative to one another at the gear ratio established by the planetary gear set 20.

Row 424 indicates an operating state in which the second brake 52 and both clutches 54, 56 are engaged. If the powertrain 10, 110, 210 or 310 is operated in this state, a second electric-only operating mode is established when both motor/generators 16 and 18 are controlled to operate as motors. The engine 12 is locked as the input member 17 and crankshaft 15 are grounded to the stationary member 60 through the connection to the grounded third member 36. Both of the planetary gear sets 20, 30 are active.

Row 426 indicates an operating mode in which both brakes 50, 52 and clutch 56 are engaged. The second member 24 is held stationary by the connection to the grounded third member 36. The third member 26 of the first planetary gear set 20 is also grounded to the stationary member 60. Because both the second member 24 and the third member 26 are grounded, the entire planetary gear set 20 is stationary. Accordingly, the input member 17 and crankshaft 15 are held stationary, locking the engine 12. The first motor/generator 16 is also locked as the first member 22 is stationary. The motor/generator 18 may be controlled to function as a motor, driving the output member 19 through the second planetary gear set 30, and thereby establishing another electric-only operating mode.

Row 428 indicates an operating mode in which the first brake 50 and both clutches 54, 56 are engaged. If the powertrain 10, 110, 210 or 310 is operated in this state, the output member 19 is locked (non-rotatable) due to the connection to the grounded third member 26. Both of the planetary gear sets 20, 30 are active, and the engine 12 may be on with the engine 12 and motor/generators 16, 18 rotating relative to one another according to the gear ratios established by the interconnected planetary gear sets 20, 30.

Row 430 indicates an operating mode in which both brakes 50, 52 and both clutches 54, 56 are engaged. If the powertrain 10, 110, 210 or 310 is operated in this mode, all of the members 22, 24, 26, 32, 34, 36 of each of the planetary gear sets 20, 30 become locked as the second members 24, 34 and third members 26, 36 are grounded to the stationary member 60. The engine 12, output member 19, and motor/generators 16, 18 are locked (i.e., nonrotatable).

Referring to FIG. 6, one sequence of operating modes for the powertrain 10, 110, 210 or 310 moves from the input-split mode of row 416 to the output-split mode of row 414 as required speed of the output member 19 increases, or moves from the output-split mode of row 414 to the input-split mode of row 416 as speed of the output member 19 decreases. The powertrain 10, 110, 210 or 310 may also be controlled to shift between operating modes of any two adjacent rows of FIG. 6. The transitional operating modes of rows 404 and 408 allow synchronous shifting between the power-split modes (input-split to compound-split, compound-split to input split, compound-split to output-split, or output-split to compound-split). The transitional operating modes are useful if one or more of the brakes 50, 52 and clutches 54, 56 are dog clutches which require substantial synchronization of speeds of both sides of the brake or clutch for engagement. If friction-type brakes 50, 52 and clutches 54, 56 are used, transitions between operating modes can occur with some slip at the brake 50, 52 or clutch 54, 56, and the transitional operating modes are not necessary. That is, a powertrain 10, 110, 210 or 310 with all friction-type brakes 50, 52 and clutches 54, 56 can shift directly from the operating mode of row 416 to the operating mode of row 418, or from row 418 to row 416. Similarly, a powertrain 10, 110, 210 or 310 with all friction-type brakes 50, 52 and clutches 54, 56 can shift directly back and forth between the operating mode of row 418 and the operating mode of row 414, between the operating mode of row 416 and row 412, between the operating mode of row 412 and the operating mode of row 414, and between the operating mode of 406 and the operating mode of row 424.

Assuming the powertrain 10, 110, 210 or 310 is operating in the input-split operating mode as described with respect to row 416 of FIG. 5, with the engine 12 on, with each of the motor/generators 16, 18 functioning as a motor or as a generator, and with the second brake 52 and the first clutch 54 engaged, if operating parameters indicate that torque and speed demands at the output member 19 merit operation in the compound-split operating mode described with respect to row 418 of FIG. 5, the second brake 52 may be released, with the first clutch 54 remaining engaged, to establish the operating mode of row 404 described with respect to FIG. 5. In this mode, the second motor/generator 18 can be used to control the speed of the third member 36 until it is substantially equal to the speed of the second member 24, at which point the clutch 56 can be synchronously engaged, with the first clutch 54 remaining engaged, to establish the compound-split operating mode of row 418.

Alternatively, the powertrain 10, 110, 210 or 310 can shift from the compound-split operating mode of row 418 to the transitional mode of row 404 by using the engine 12 and the second motor/generator 18 to control the speed of the third member 36 until it is substantially equal to the speed of the second member 24, at which point the clutch 56 can be synchronously disengaged, with the first clutch 54 remaining engaged to establish the transitional mode of row 404. The motor/generator 18 may then be used to control the speed of the third member 36 until it is substantially stationary, at which point the second brake 52 may be synchronously engaged, with the first clutch 54 also remaining engaged, to establish the input-split operating mode of row 416.

If the powertrain 10, 110, 210 or 310 is operating in the compound-split operating mode of row 418, and operating parameters indicate that torque and speed demands at the output member 19 merit operation in the output-split operating mode described with respect to row 414 of FIG. 5, then the powertrain 10, 110, 210 or 310 may be controlled to establish the transitional mode described with respect to row 408 to allow synchronous shifting to the output-split mode of row 414. Specifically, from the compound-split operating mode of row 418, the first clutch 54 may be released, with the second clutch 56 remaining engaged, to establish the operating mode of row 408 described with respect to FIG. 5. In this mode, the engine 12 and the second motor/generator 18 drive the output member 19. The motor/generator 16 can be used to control the speed of the third member 26 until it is substantially stationary, at which point the brake 50 can be synchronously engaged, with the second clutch 56 remaining engaged, to establish the output-split operating mode of row 414.

Alternatively, the powertrain 10, 110, 210 or 310 can shift from the output-split operating mode of row 414 to the transitional mode of row 408 by disengaging the first brake 50, with the second clutch 56 remaining engaged to establish the transitional operating mode of row 408. The motor/generator 16 may then be used to control the speed of the third member 26 until it is substantially equal to the speed of the second member 34, at which point the first clutch 54 may be synchronously engaged, with the second clutch 56 also remaining engaged, to establish the compound-split operating mode of row 418.

Referring to FIG. 7, another sequence of operating modes for the powertrain 10, 110, 210 or 310 moves from the input-split mode of row 416 to the output-split mode of row 414 as required speed of the output member 19 increases, or begins with the output-split mode of row 414 and ends with the input-split mode of row 416 as speed of the output member 19 decreases. The powertrain 10, 110, 210 or 310 may also be controlled to shift between operating modes of any two adjacent rows of FIG. 7. The transitional operating modes of rows 406 and 402 allow synchronous shifting between the input-split and series operating modes of rows 416 and 412, and between the series operating mode and the output-split operating mode of rows 412 and 414.

Assuming the powertrain 10, 110, 210 or 310 is in the input-split operating mode of row 416, as described with respect FIG. 5, with the engine 12 on, with each of the motor/generators 16, 18 functioning as a motor or as a generator, and with the second brake 52 and the first clutch 54 engaged, if operating parameters indicate that torque and speed demands at the output member 19 merit operation in the series operating mode described with respect to row 412 of FIG. 5, the first clutch 54 may be released, with the second brake 56 remaining engaged, to establish the operating mode of row 406 described with respect to FIG. 5 as an electric-only operating mode. In the operating mode of row 406, the second motor/generator 18 drives the output member 19 through the second planetary gear set 30, and the engine 12, the first motor/generator 16, and the first planetary gear set 20 do not affect the output member 19. Thus, the engine 12 and first motor/generator 16 can be used to control the speed of the third member 26 until it is substantially stationary, at which point the brake 50 can be synchronously engaged, with the brake 52 remaining engaged, to establish the series operating mode of row 412.

Alternatively, the powertrain 10, 110, 210 or 310 can shift from the series operating mode of row 412 to the transitional electric-only operating mode of row 406 by releasing the first brake 50, with the second brake 52 remaining engaged to establish the transitional mode of row 406. The engine 12 and motor/generator 16 may then be used to control the speed of the third member 26 until it is substantially equal to the speed of the second member 34, at which point the first clutch 54 may be synchronously engaged, with the second brake 52 also remaining engaged, to establish the input-split operating mode of row 416.

If the powertrain 10, 110, 210 or 310 is operating in the series operating mode of row 412, and operating parameters indicate that torque and speed demands at the output member 19 merit operation in the output-split operating mode described with respect to row 414 of FIG. 5, then the powertrain 10, 110, 210 or 310 may be controlled to establish the mode of row 402 to allow shifting to the output-split operating mode of row 414. Specifically, from the series operating mode of row 412, the second brake 52 may be released, with the first brake 50 remaining engaged, to establish the operating mode of row 402 described with respect to FIG. 5. In this mode, the engine 12 charges the motor/generator 16 which acts as a generator. The engine 12 and motor/generator 16 control the speed of the second member 24, which may be made substantially equal to the speed of the third member 36 to allow the second clutch 56 to be synchronously engaged, with the first brake 50 remaining engaged, establishing the output-split operating mode of row 414.

Alternatively, the powertrain 10, 110, 210 or 310 can shift from the output-split operating mode of row 414 to the transitional mode of row 402 by disengaging the second clutch 56, with the first brake 50 remaining engaged to establish the transitional mode of row 402. The engine 12 is on and charging the motor/generator 16. The motor/generator 18 can be used to control the speed of the third member 36 so that the second brake 52 can be synchronously engaged to establish the series operating mode of row 412.

Referring to FIG. 8, another sequence of operating modes for the powertrain 10, 110, 210 or 310 moves from mechanical neutral mode of row 400 to the electric-only mode of row 424 as required speed of the output member 19 increases, or begins with the electric-only operating mode of row 424 and ends with the mechanical neutral operating mode of row 400 as speed of the output member 19 decreases. The powertrain 10, 110, 210 or 310 may also be controlled to switch between any two adjacent rows of FIG. 8. Assuming that the powertrain 10, 110, 210 or 310 begins in the mechanical neutral mode of row 400, in which none of the brakes 50, 52 and none of the clutches 54, 56 are engaged, the powertrain 10, 110, 210 or 310 can be switched to the electric-only operating mode of row 406 by engaging the second brake 52. The motor/generator 18 is then controlled to function as a motor to provide torque at the output member 19 with torque multiplication through the second planetary gear set 30. If operating parameters indicate that torque and speed demands at the output member 19 merit operation in the electric-only driving mode of row 424, in which both motor/generators 16, 18 act as motors, such as when greater torque is required at the output member 19, because the brake 52 is already engaged, the clutch 56 may be engaged to lock the engine 12. The speed of the third member 26 can then be controlled by the first motor/generator 16 until it is substantially equal to the speed of the second member 34, to allow the first clutch 54 to be engaged synchronously to establish the electric-only operating mode of row 424. If operating conditions indicate that the powertrain 10 should be switched to operate in the electric-only mode of row 406, then the first clutch 54 can be disengaged and the clutch 56 then disengaged so that only the second motor/generator 18 drives the output member 19.

While the best modes for carrying out the invention have been described in detail, those familiar with the art to which this invention relates will recognize various alternative designs and embodiments for practicing the invention within the scope of the appended claims.

The invention claimed is:

1. A powertrain comprising:
   an engine having a crankshaft;
   an input member operatively connectable for rotation with the crankshaft;
   an output member;
   a stationary member;
   a first and a second electric motor/generator;
   a first and a second planetary gear set each having a respective first, second, and third member;
   wherein the first motor/generator is continuously connected for common rotation with the first member of the first planetary gear set; wherein the second motor/generator is continuously connected for common rotation with the first member of the second planetary gear set; wherein the input member is continuously connected for common rotation with the second member of the first planetary gear set; wherein the output member is continuously connected for common rotation with the second member of the second planetary gear set;
   a first brake selectively engageable to ground the third member of the first planetary gear set to the stationary member;
   a second brake selectively engageable to ground the third member of the second planetary gear to the stationary member;
   a first clutch selectively engageable to connect the third member of the first planetary gear set for common rotation at the same speed as the second member of the second planetary gear set;
   a second clutch selectively engageable to connect the second member of the first planetary gear set for common rotation at the same speed as the third member of the second planetary gear set;
   wherein engagement of only the first brake allows the engine to be started by the first motor/generator without any effect on torque at the output member; and
   wherein the powertrain is operable to provide an input-split mode of operation, a compound-split mode of operation, and an output-split mode of operation.

2. The powertrain of claim 1, wherein the first member, the second member, and the third member of each of the planetary gear sets is a sun gear member, a carrier member, and a ring gear member, respectively.

3. The powertrain of claim 1, wherein the input-split mode of operation is established when only the first clutch and the second brake are engaged, the engine is on, and the first and second motor/generators function as motors or generators to assist the engine in providing torque required at the output member;
   wherein the output-split mode of operation is established when only the first brake and the second clutch are engaged, the engine is on, and the first and second motor/generators function as motors or generators to assist the engine in providing torque required at the output member; and
   wherein the compound-split mode of operation is established when only the first clutch and the second clutch are engaged, the engine is on, and the first and second motor/generators function as motors or generators to assist the engine in providing torque required at the output member.

4. The powertrain of claim 1, wherein the powertrain operates in an electric-only operating mode with the engine off and only the second motor/generator functioning as a motor when only the second brake is engaged.

5. The powertrain of claim 1, wherein the powertrain is operable in a series operating mode when both of the first brake and the second brake are engaged, the engine is on, the first motor/generator functions as a generator, and the second motor/generator functions as a motor.

6. The powertrain of claim 1, wherein the powertrain operates in an electric-only operating mode with only the second motor/generator functioning as a motor when only the second brake is engaged; and
   wherein the powertrain is operable in a series operating mode when both of the first brake and the second brake are engaged, the engine is on, the first motor/generator functions as a generator, and the second motor/generator functions as a motor.

7. The powertrain of claim 6, wherein the engine and the first motor/generator are used to control speeds of the third member of the first planetary gear set to allow synchronous engagement of the first brake to transition between the electric-only operating mode and the series operating mode, and to allow synchronous engagement or disengagement of the first clutch to transition between the electric-only operating mode and the input-split operating mode.

8. The powertrain of claim 1, wherein the powertrain operates in an electric-only operating mode with both of the first and the second motor/generators functioning as motors when only the first clutch, the second clutch, and the second brake are engaged.

9. The powertrain of claim 1, wherein the powertrain is operable to transition between the compound-split operating mode and the output-split operating mode when the second clutch is engaged, the engine is on, the second motor/generator is functioning as a motor, and the first motor/generator is used to control the speed of the third member of the first planetary gear set to allow synchronous engagement or disengagement of the first brake and the first clutch.

10. The powertrain of claim 1, wherein the powertrain is operable to transition between the input-split operating mode and the compound-split operating mode when the first clutch is engaged, the engine is on, the first motor/generator is functioning as a motor, and the second motor/generator is used to control the speed of the third member of the second planetary gear set to allow synchronous engagement or disengagement of the second brake and the second clutch.

11. The powertrain of claim 1, wherein the powertrain is operable in a series operating mode when both of the first brake and the second brake are engaged, the engine is on, the first motor/generator functions as a generator, and the second motor/generator functions as a motor;

wherein the powertrain is operable to transition between the output-split operating mode and the series operating mode when the first brake is engaged, the engine is on, and the first motor/generator is used to control the speed of the third member of the second planetary gear set to allow synchronous engagement or disengagement of the second brake and the second clutch.

12. The powertrain of claim 1, wherein the powertrain is operable to transition between a first and a second electric-only operating mode when the second brake is engaged, the engine is off, the second motor/generator is functioning as a motor, and the first motor/generator is used to control the speed of the third member of the first planetary gear set to allow synchronous engagement or disengagement of the first clutch, with the second clutch also engaged in the second electric-only operating mode.

13. The powertrain of claim 1, further comprising:
an air conditioner compressor;
a first additional clutch selectively engageable to operatively connect the air conditioner compressor to the first motor/generator to allow the first motor/generator to drive the air conditioner compressor; and
a second additional clutch selectively engageable to operatively connect the air conditioner compressor to the engine to allow the engine to drive the air conditioner compressor.

14. The powertrain of claim 1, further comprising:
a final drive mechanism including a set of intermeshing gears connected with the output member.

15. A powertrain comprising:
an engine;
a stationary member;
a first and a second motor/generator;
a first and a second planetary gear set each having a sun gear member, a ring gear member, and a carrier member;
wherein the first motor/generator is continuously connected for rotation with the sun gear member of the first planetary gear set and the engine is connected for rotation with the carrier member of the first planetary gear set;
wherein the second motor/generator is continuously connected for rotation with the sun gear member of the second planetary gear set and the output member is connected for rotation with the carrier member of the second planetary gear set;
a first brake selectively engageable to ground the ring gear member of the first planetary gear set to the stationary member to allow the first motor/generator to be used to start the engine with torque multiplication from the sun gear member of the first planetary gear set to the carrier member of the first planetary gear set;
a second brake selectively engageable to ground the ring gear member of the second planetary gear set to the stationary member to allow the second motor/generator to be used to provide torque at the output member with torque multiplication from the sun gear member of the second planetary gear set to the carrier member of the second planetary gear set; and wherein none of the members of the first planetary gear set are continuously connected for common rotation with any of the members of the second planetary gear set.

16. The powertrain of claim 15, further comprising:
a first clutch selectively engageable to connect the ring gear member of the first planetary gear set for common rotation with the carrier member of the second planetary gear set;
a second clutch selectively engageable to connect the ring gear member of the second planetary gear set for common rotation with the carrier member of the first planetary gear set; and
wherein the powertrain provides a compound-split operating mode when only the first and the second clutches are engaged, the engine is on, and the motor/generators function as motors or as generators to assist the engine in providing torque required at the output member.

17. The powertrain of claim 15, wherein the first motor/generator is not continuously connected to any members of the planetary gear sets other than the sun gear member of the first planetary gear set.

18. The powertrain of claim 15, further comprising:
an air conditioner compressor;
a first additional clutch selectively engageable to connect the air conditioner compressor to the first motor/generator to allow the first motor/generator to drive the air conditioner compressor; and
a second additional clutch selectively engageable to connect the air conditioner compressor to the engine to allow the engine to drive the air conditioner compressor.

19. A hybrid transmission connectable with an engine comprising:
an input member and an output member;
a stationary member;
a first and a second motor/generator;
a first and a second planetary gear set each having a first member, a second member, and a third member;
wherein the first motor/generator is continuously connected for common rotation with the first member of the first planetary gear set and the input member is continuously connected for common rotation with the second member of the first planetary gear set;
wherein the second motor/generator is continuously connected for common rotation with the first member of the second planetary gear set and the output member is continuously connected for common rotation with the second member of the second planetary gear set;
a first brake selectively engageable to connect the third member of the first planetary gear set to the stationary member to operatively connect the first motor/generator with the input member with torque multiplication from the first motor/generator to the input member without affecting rotation of the second planetary gear set;
a second brake selectively engageable to connect the third member of the second planetary gear set to the stationary member to operatively connect the second motor/generator with the output member with torque multiplication from the second motor/generator to the output member without affecting rotation of the first planetary gear set;
a first clutch selectively engageable to connect the third member of the first planetary gear set with the second member of the second planetary gear set for common rotation at the same speed;

a second clutch selectively engageable to connect the third member of the second planetary gear set with the second member of the first planetary gear set for common rotation at the same speed; and wherein the hybrid transmission is operable in a series mode by engaging the first and second brakes and a compound-split operating mode by engaging the first and second clutches when the hybrid transmission is connected with the engine.

20. The hybrid transmission of claim 19, wherein the first member of each of the first and second planetary gear sets is a sun gear member, the second member of each of the first and second planetary gear sets is a carrier member, and the third member of each of the first and second planetary gear sets is a ring gear member; and further comprising:

a final drive mechanism having a first gear connected for common rotation with the output member, a second gear meshing with the first gear, and a final drive output connected for common rotation with the second gear.

* * * * *